(12) United States Patent
Zhou et al.

(10) Patent No.: US 11,841,610 B2
(45) Date of Patent: Dec. 12, 2023

(54) LENS ADJUSTING DEVICE AND PROJECTION APPARATUS

(71) Applicant: APPOTRONICS CORPORATION LIMITED, Guangdong (CN)

(72) Inventors: Jianhua Zhou, Shenzhen (CN);
Zhengping Zhou, Shenzhen (CN);
Xianpeng Zhang, Shenzhen (CN); Xin Yu, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 0 days.

(21) Appl. No.: 17/765,141

(22) PCT Filed: Aug. 31, 2020

(86) PCT No.: PCT/CN2020/112633
§ 371 (c)(1),
(2) Date: Mar. 30, 2022

(87) PCT Pub. No.: WO2021/063143
PCT Pub. Date: Apr. 8, 2021

(65) Prior Publication Data
US 2022/0365409 A1   Nov. 17, 2022

(30) Foreign Application Priority Data

Sep. 30, 2019   (CN) .......................... 201910943968.0

(51) Int. Cl.
*G03B 21/14* (2006.01)
*G02B 7/02* (2021.01)

(52) U.S. Cl.
CPC ................. *G03B 21/142* (2013.01)

(58) Field of Classification Search
CPC ...... G03B 21/142; G03B 21/145; G02B 7/02; G02B 7/003; G02B 7/023
See application file for complete search history.

(56) References Cited

U.S. PATENT DOCUMENTS

2021/0240062 A1*   8/2021   Hirasawa ............... G02B 7/005

FOREIGN PATENT DOCUMENTS

| CN | 101373242 | 2/2009 |
| CN | 105137560 | 12/2015 |

(Continued)

OTHER PUBLICATIONS

International Search Report for corresponding International Application PCT/CN2020/112633, dated Dec. 1, 2020.

*Primary Examiner* — Ryan D Howard
(74) *Attorney, Agent, or Firm* — Burris Law, PLLC

(57) ABSTRACT

Provided are a lens adjusting device and a projection apparatus. The device includes a first adjusting support including a lens support, a first guide post and a second guide post; and a second adjusting support including a moving support, a first limit slot, and a first boss. The first guide post is fixedly clamped in the first limit slot, the second guide post being connected to the first boss, and the lens support being supported by and slidably connected to the first guide post and second guide post, such that the lens support is slidable relative to the second adjusting support along the first direction. The lens support is configured to adjust a position of the second guide post relative to the first boss prior to the second guide post and the first boss being fastened to each other to parallel the second guide post and the first guide post.

20 Claims, 6 Drawing Sheets

(56) References Cited

FOREIGN PATENT DOCUMENTS

| | | |
|---|---|---|
| CN | 107065408 | 8/2017 |
| CN | 206440869 | 8/2017 |
| CN | 210924164 | 7/2020 |
| JP | 2003330116 | 11/2003 |

* cited by examiner

LENS ADJUSTING DEVICE AND PROJECTION APPARATUS

CROSS-REFERENCE TO RELATED APPLICATIONS

This application is a national phase application of International Application No. PCT/CN2020/112633, filed on Aug. 31, 2020, which claims priority to and the benefit of Chinese Patent Application No. 201910943968.0, filed on Sep. 30, 2019. The disclosures of the above applications are incorporated herein by reference.

FIELD

The present disclosure relates to the technical field of optics, and in particular, to a lens adjusting device and a projection apparatus.

BACKGROUND

The statements in this section merely provide background information related to the present disclosure and may not constitute prior art.

With the continuous development of projection apparatus, people have an increasingly high requirement for projective quality of the projection apparatus. In a projection apparatus, a lens is usually fixed on a lens adjusting device, and a relative position or angle of the lens is adjusted by adjusting the lens adjusting device, so as to adjust projective quality of a projection image. Therefore, adjustment accuracy of the lens adjusting device directly affects the projective quality of the projection image.

SUMMARY

This section provides a general summary of the disclosure and is not a comprehensive disclosure of its full scope or all of its features.

The present disclosure is intended to provide a lens adjusting device and a projection apparatus. The lens adjusting device can adjust a parallelism in an assembling process, which resolves a problem of low position adjustment reliability of the lens adjusting device.

To achieve the above objective, an embodiment of the present disclosure provides a lens adjusting device, including: a first adjusting support including a lens support, a first guide post and a second guide post; the first and second guide posts being separated from each other, respectively disposed on two opposite sides of the lens support and each extending along a first direction; and a second adjusting support including a moving support, a first limit slot recessed from a side of the moving support, and a first boss protruding from another side of the moving support. The first guide post is fixedly clamped in the first limit slot, the second guide post is connected to the first boss, and the lens support is supported by the first guide post and the second guide post and slidably connected to the first guide post and the second guide post, such that the lens support is slidable relative to the second adjusting support along the first direction. The lens support is configured to adjust a position of the second guide post relative to the first boss prior to the second guide post and the first boss being fastened to each other to parallel the second guide post and the first guide post.

An embodiment of the present disclosure provides a projection apparatus, including a lens and an optical machine assembly. The projection apparatus includes the lens adjusting device described herein. A side, away from the second adjusting support, of the fixed support is connected to the optical machine assembly, and the lens is fixed onto the lens support.

Compared with related technologies, in the lens adjusting device provided in the present disclosure, the first guide post is fixedly clamped in the first limit slot, and the second guide post is connected to the first boss. Based on this structural configuration, in the assembling process, the first guide post is completely and fixedly clamped in the first limit slot, and the second guide post is connected to the first boss to ensure that they are not fastened, such that the relative positions of the second guide post and the first boss that are not fastened are adjusted by using the lens support, so as to adjust the parallelism between the second guide post and the first guide post, effectively improve the parallelism between the second guide post and the first guide post, and ensure that the first guide post and the second guide post are parallel. This avoids asynchronous movement, sudden change, discontinuity, or jamming when the lens support slides relatively on the first guide post and the second guide post in the adjustment process, thereby effectively improving adjustment smoothness and ensuring reliability of position adjustment.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
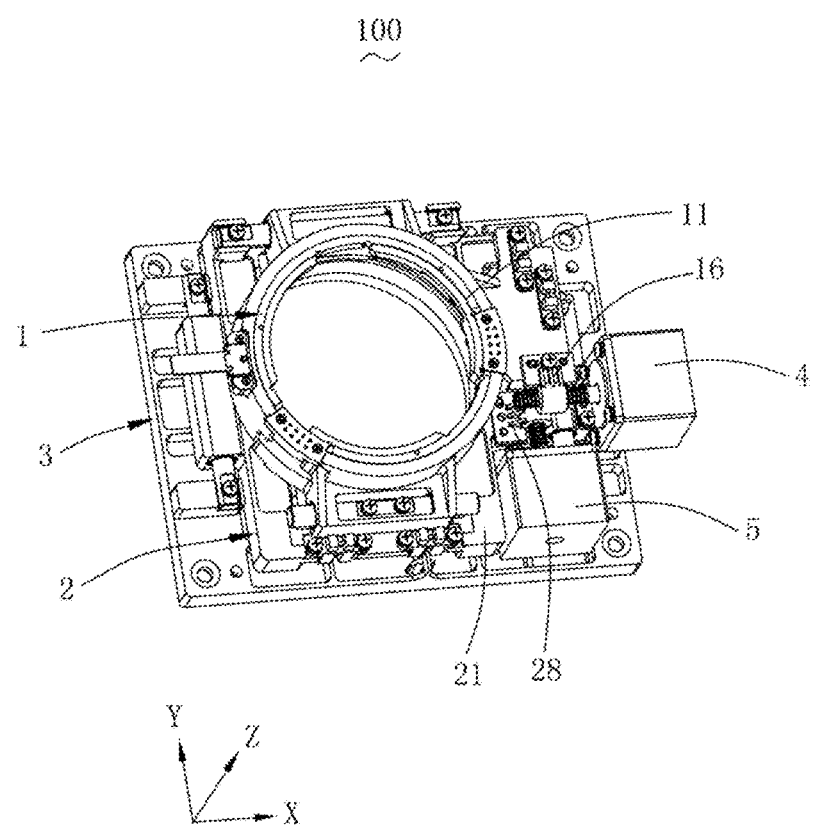
FIG. 1 is a perspective schematic structural diagram of a lens adjusting device according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The technical solutions of the embodiments of the present disclosure are clearly and completely described below with reference to the drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

In the related art, a lens adjusting device includes an adjusting assembly. The adjusting assembly includes a first adjusting support and a second adjusting support that are connected sequentially. The first adjusting support includes a first body portion and two guide posts that are respectively disposed on two opposite sides of the first body portion and each extend along a first direction. The first body portion is supported by the two guide posts and slidably connected to the two guide posts. The first adjusting support is slidably connected relative to the second adjusting support along the first direction.

However, it is difficult to adjust a parallelism between the two guide posts in an assembling process, resulting in a low parallelism between the two guide posts that have been installed. In an adjustment process, it is easy to cause asynchronous movement, sudden change, discontinuity, or jamming between the adjusting support and the second adjusting support, reducing reliability of position adjustment.

Therefore, it needs to provide a new lens adjusting device and projection apparatus to resolve the above technical problems.

As shown in FIG. 1, the present disclosure provides a lens adjusting device 100, including a first adjusting support 1 and a second adjusting support 2 that are connected sequentially.

The first adjusting support 1 is installed onto the second adjusting support 2 to adjust a projection position of a projection apparatus. Accuracy of installing the first adjusting support 1 onto the second adjusting support 2 determines projective quality of the projection apparatus. A specific structure of each component of the lens adjusting device 100 is described below with reference to the accompanying drawings.

Figure 2:
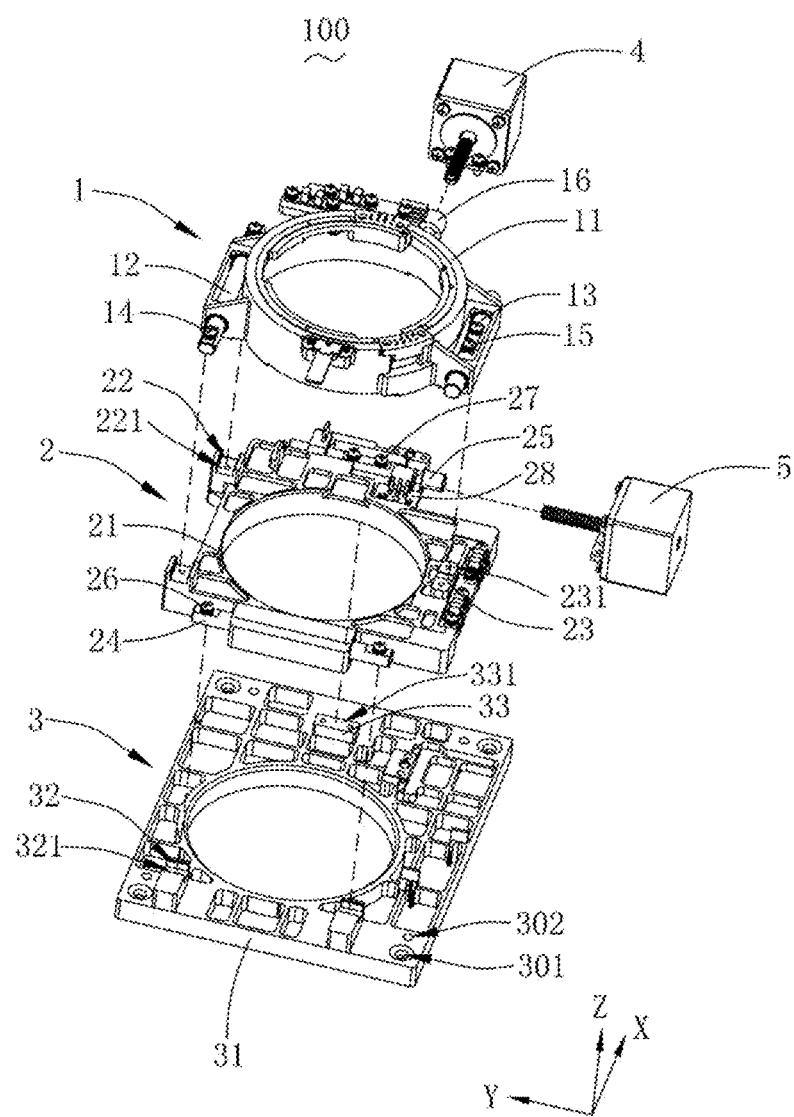
FIG. 2 is a perspective exploded view illustrating a structure of a lens adjusting device according to the present disclosure.
Figure 3:
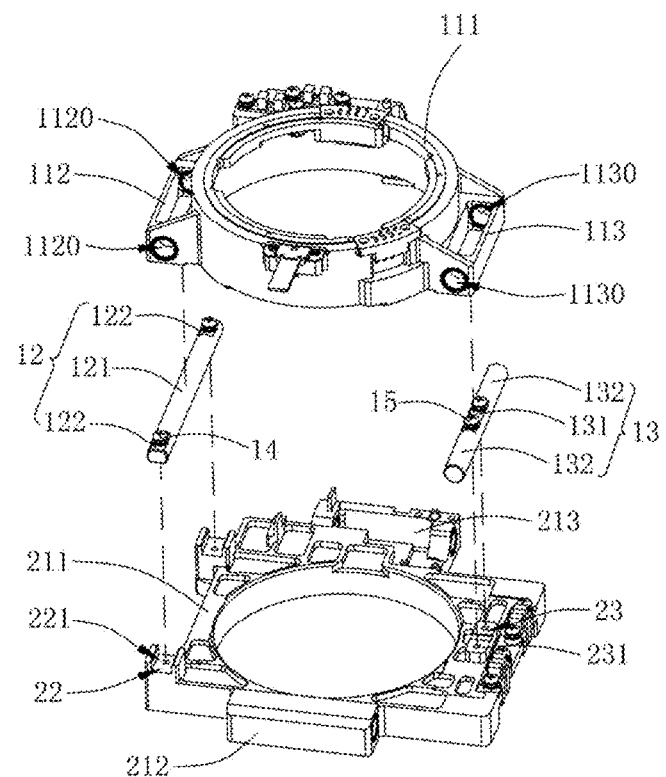
FIG. 3 is a perspective exploded view illustrating structures of a first adjusting support and a second adjusting support according to the present disclosure.
Figure 4:
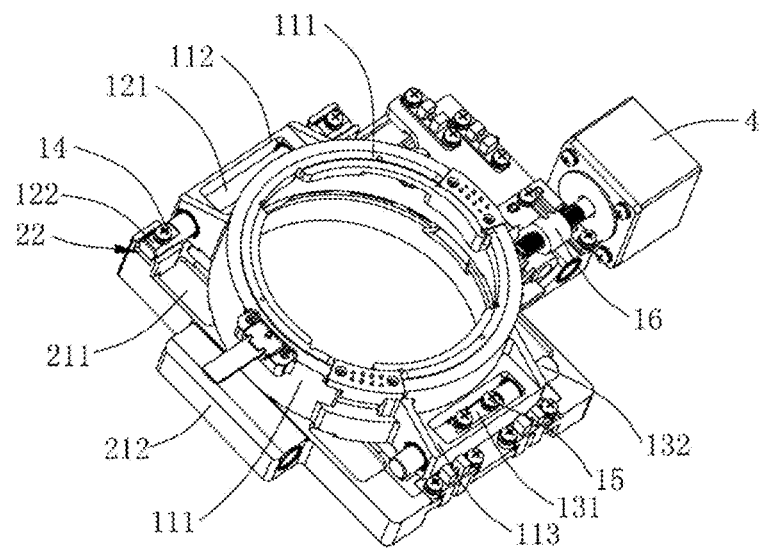
FIG. 4 is a perspective structural assembly drawing of a first adjusting support and a second adjusting support according to the present disclosure.

As shown in FIG. 2 to FIG. 4, in an implementation, as a connecting component between a lens and the lens adjusting device 100, the first adjusting support 1 is disposed between a fixed support 3 and the lens, and a parallelism of the installed first adjusting support 1 directly affects lens adjustment reliability of the whole lens adjusting device 100.

Specifically, the first adjusting support 1 includes a lens support 11 for fixing and supporting the lens, and a first guide post 12 and a second guide post 13 that are respectively disposed on two opposite sides of the lens support 11. It should be noted herein that, an extension direction of each of the first guide post 12 and the second guide post 13 is defined as a first direction (namely, an x-axis direction), and the first direction is one of degrees of freedom related to adjustment of the projection position of the projection apparatus.

The second adjusting support 2 includes a moving support 21, a first limit slot 22 recessed from a side of the moving support 21, and a first boss 23 protruding from another side of the moving support 21.

The first guide post 12 is fixedly clamped in the first limit slot 22. The second guide post 13 is connected to the first boss 23. The lens support 11 is supported by the first guide post 12 and the second guide post 13, and is slidably connected to the first guide post 12 and the second guide post 13, such that the lens support 11 can slide relative to the moving support 21 along the first direction.

In an implementation, a quantity of first limit slots 22 is not limited, and is specifically configured based on an actual design. In this implementation, there are two first limit slots 22, and the two first limit slots 22 are spaced and arranged on a same side of the moving support 21.

The first guide post 12 includes a first guide section 121 and two first fixed sections 122 that protrude from two opposite ends of the first guide section 121. The two first fixed sections 122 are fixedly clamped in the two first limit slots 22, respectively.

The second guide post 13 includes a second fixed section 131 and two second guide sections 132 that protrude from two opposite ends of the second fixed section 131. The second fixed section 131 is connected to the first boss 23.

The lens support 11 is supported by the first guide section 121 and the two second guide sections 132, and is slidably connected to the first guide section 121 and the two second guide sections 132, such that the lens support 11 is slidably connected relative to the moving support 21 along the first direction.

In an implementation, the lens support 11 includes a lens support body 111, a first support portion 112 and a second support portion 113. The first support portion 112 and the second support portion 113 are respectively fixed on two opposite sides of the lens support body 111 and are hollow.

The first support portion 112 includes two first support holes (not shown in figures) penetrating therethrough along the first direction, each first support hole is provided with a first sliding sleeve 1120, and the first support portion 112 is located between two first limit slots 22, and is slidably connected to the first guide section 121 through two first sliding sleeves 1120.

The second support portion 113 includes two second support holes (not shown in figures) penetrating therethrough along the first direction. Each second support hole is provided with a second sliding sleeve 1130. The second support portion 113 is slidably connected to the second guide section 132 through two second sliding sleeves 1130 corresponding thereto. The first boss 23 is accommodated in the second support portion 113.

In the above-described structure, the first adjusting support 1 adjusts, by using the lens support 11, the relative positions of the second guide post 13 and the first boss 23 that are not fastened, to adjust the parallelism between the second guide post 13 and the first guide post 12. More specifically, the first guide post 12 is fixedly clamped in two first limit slots 22 by using two first fixed sections 122 respectively. The second guide post 13 is connected to the first boss 23 by using the second fixed section 131. The lens support 11 is supported by the first guide section 121 and two second guide sections 132. However, in the assembling process, the first fixed section 122 is fixedly clamped in the first limit slot 22. In this case, the first guide post 12 is fastened to the two first limit slots 22. Then, the second guide post 13 is connected to the first boss 23 to ensure that they are in an incomplete fastening state. In other words, the second guide post 13 is not fastened to the first boss 23. and reciprocating sliding is performed on the lens support 11 to drive the second fixed section 131 to perform fine movement relative to the first boss 23, such that the relative positions of the second fixed section 131 and the first boss 23 are adjusted, so as to adjust the parallelism between the second guide post 13 and the first guide post 12. In this way, the second guide post 13 is adaptively adjusted to a position parallel to the first guide post 12. Finally, the second guide post 13 is fastened to the first boss 23 to complete assembling of the first adjusting support 1. This effectively improves the parallelism between the first guide post 12 and the second guide post 13, ensures that the first guide post 12 and the second guide post 13 are parallel, avoids asynchronous movement, sudden change, discontinuity, or jamming when the lens support 11 slides relatively on the first guide post 12 and the second guide post 13 in an adjustment process, effectively improves smoothness of position adjustment along the first direction, and ensures reliability and accuracy of position adjustment along the first direction.

In an implementation, an end that is of the first fixed section 122 and connected to a bottom surface 221 of the first limit slot 22 is a plane. An end that is of each second fixed section 131 and connected to a top surface 231 of the first boss 23 is a plane. The bottom surface 221 of the first limit slot 22 and the top surface 231 of the first boss 23 are located in a same plane, such that the first guide post 12 and the second guide post 13 are installed coplanarly. Therefore, the first guide post 12 and the second guide post 13 are disposed on a same plane, to further ensure adjustment accuracy of the parallelism and effectively improve the parallelism between the first guide post 12 and the second guide post 13.

In an implementation, the first adjusting support 1 further includes a first screw 14 and a second screw 15. Each first fixed section 122 is provided with a first through hole (not shown in the figure) penetrating the first fixed section 122. Each first limit slot 22 is provided with a first threaded hole (not shown in the figure). The first screw 14 is connected to the first threaded hole through the first through hole to fix the first fixed section 122 into the first limit slot 22. A diameter of the first through hole is greater than a diameter of the first screw 14. Each second fixed section 131 is provided with a second through hole (not shown in the figure) penetrating the second fixed section 131. Each first boss 23 is provided with a second threaded hole (not shown in the figure). The second screw 15 is connected to the second threaded hole through the second through hole to press the second fixed section 131 against the first boss 23. A diameter of the second through hole is greater than a diameter of the second screw 15. In other words, there is a certain gap between the first screw 14 and the first through hole, and there is also a certain gap between the second screw 35 and the second through hole. This configuration is equivalent to reserving certain space for the first guide post 12 and the second guide post 13 to move during installation, effectively improving the adjustment accuracy of the parallelism between the first guide post 12 and the second guide post 13. In actual application, based on a demand for actual accuracy, the gap may be set specifically to realize a gap at a micron level, so as to further improve accuracy of the parallelism between the first guide post 12 and the second guide post 13.

As shown in FIG. 1, it should be noted that, in actual application, the lens adjusting device 100 needs to be installed onto the projection apparatus. In this implementation, the lens adjusting device 100 further includes a fixed support 3 for connecting the lens adjusting device 100 and the projection apparatus, and the second adjusting support 2 is supported by a side, away from the projection apparatus, of the fixed support 3. Certainly, in order to increase a position adjustment range of the lens adjusting device 100, in an implementation, the second adjusting support 2 is slidably connected relative to the fixed support 3 along a second direction (namely, a y-axis direction). In this case, both the first adjusting support 2 and the second adjusting support 3 are used as position adjustment components to perform position adjustment of the lens in the first direction and/or the second direction. This effectively improves position adjustment performance of the lens adjusting device 100, increases the position adjustment range, and realizes two directional adjustments of the projection position of the projection apparatus.

Figure 5:
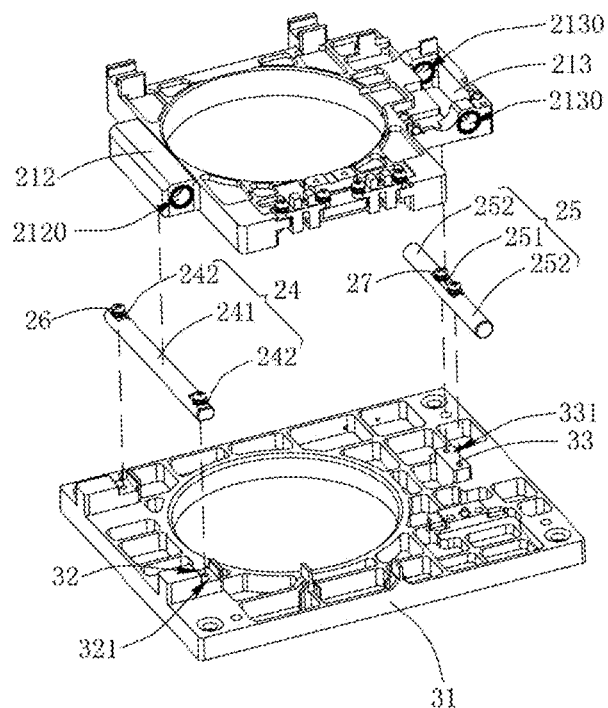
FIG. 5 is a perspective exploded view illustrating structures of a second adjusting support and a fixed support according to the present disclosure.
Figure 6:
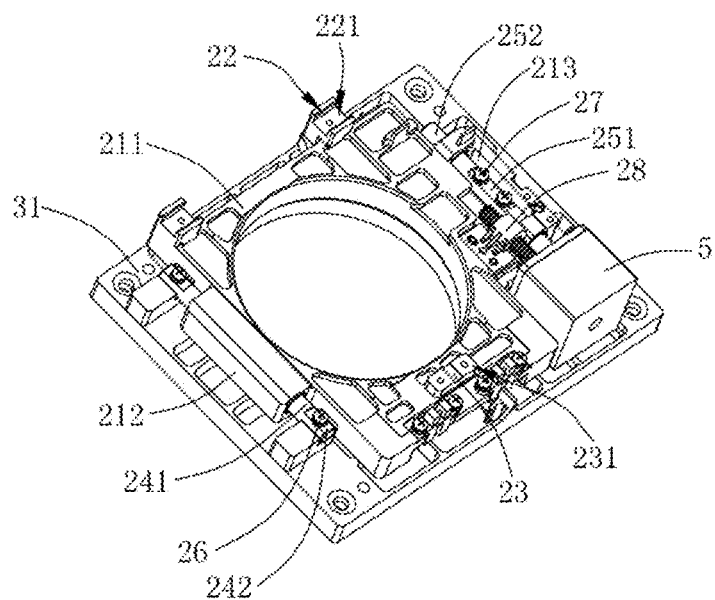
FIG. 6 is a perspective structural assembly drawing of a second adjusting support and a fixed support according to the present disclosure.
Figure 7:
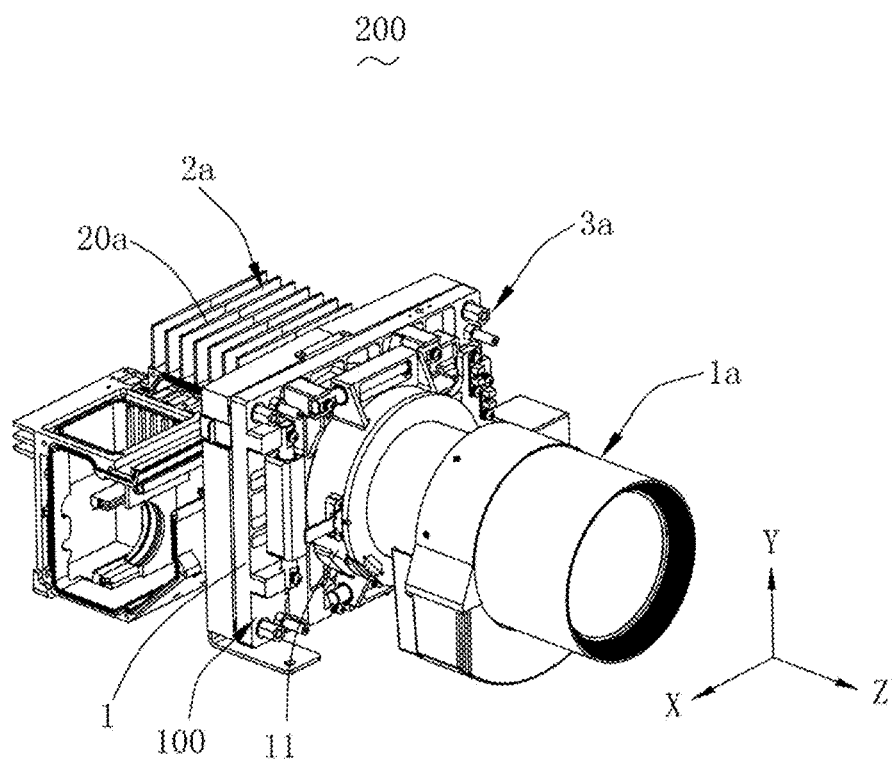
FIG. 7 is a perspective schematic structural diagram of a projection apparatus according to the present disclosure.
Figure 8:
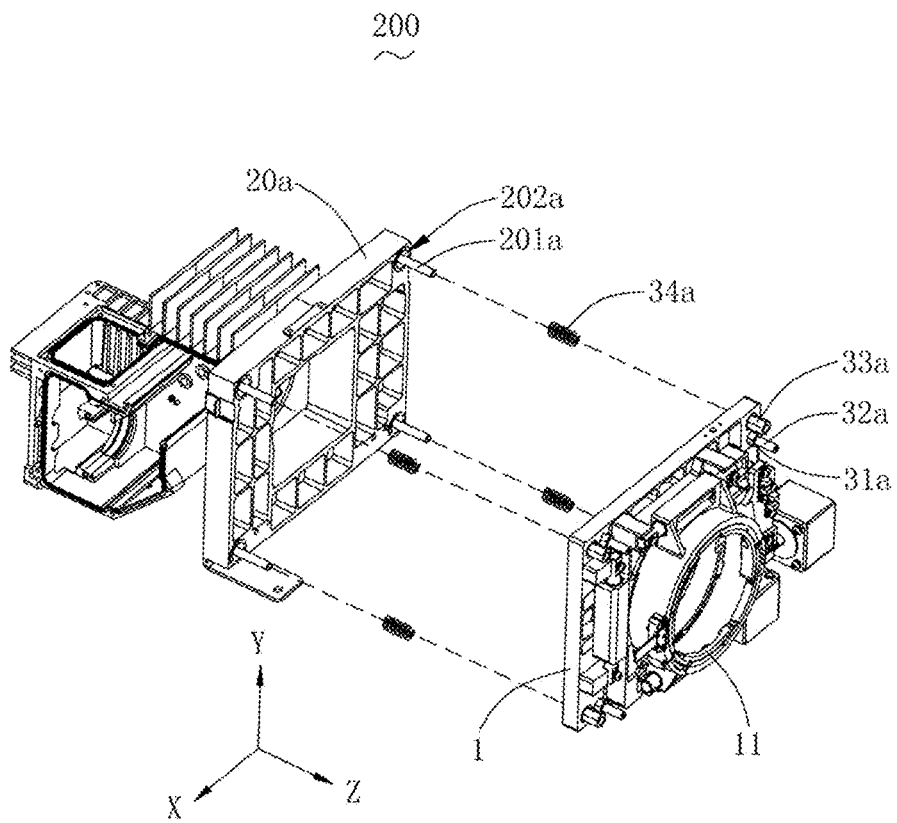
FIG. 8 is a perspective exploded view illustrating a structure of a projection apparatus according to the present disclosure.
Figure 9:
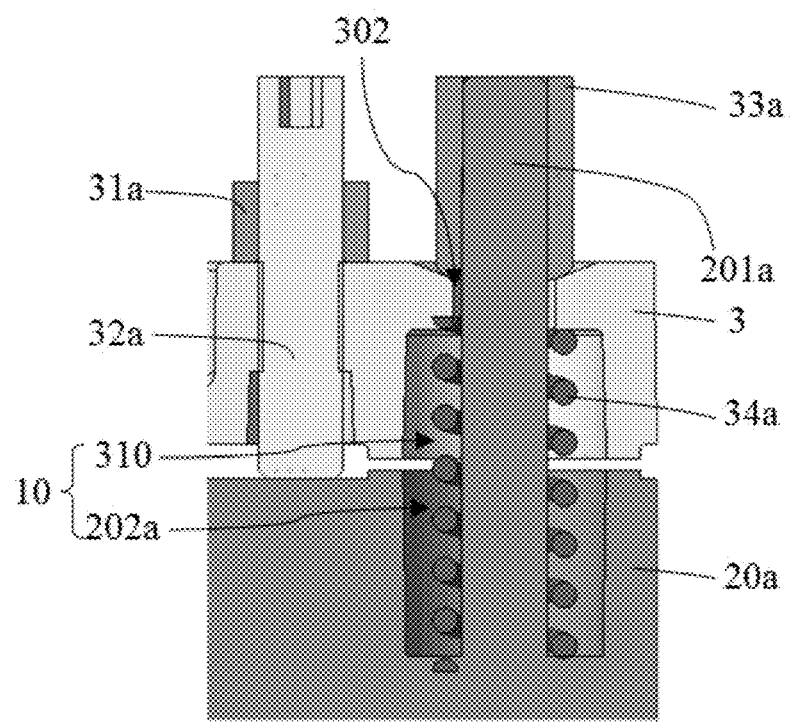
FIG. 9 is a schematic diagram illustrating structural connection between an optical-machine bottom case, a fixed support, and an adjustable connecting assembly according to the present disclosure.

Specifically, as shown in FIG. 2, FIG. 5, and FIG. 6, in this implementation, the fixed support 3 includes a fixed support body 31, a second limit slot 32 recessed from a side of the fixed support body 31, and a second boss 33 protruding from another side of the fixed support body 31.

As a connecting component between the first adjusting support 1 and the fixed support 3, the second adjusting support 2 is disposed between the fixed support 3 and the lens, and a parallelism of the installed second adjusting support 2 directly affects the lens adjustment reliability of the whole lens adjusting device 100.

The second adjusting support 2 further includes a third guide post 24 and a fourth guide post 25 that are respectively disposed on two opposite sides of the moving support 21. It should be noted herein that, an extension direction of each of the third guide post 24 and the fourth guide post 25 is the second direction (namely, the y-axis direction). The second direction is one of the degrees of freedom related to adjustment of the projection position of the projection apparatus, and the second direction is perpendicular to the first direction.

The third guide post 24 is fixedly clamped in the second limit slot 32. The fourth guide post 25 is connected to the second boss 33. The moving support 21 is supported by the third guide post 24 and two fourth guide posts 25, and is slidably connected to the third guide post 24 and the fourth guide posts 25. In this way, the moving support 21 can slide relative to the fixed support 3 along the second direction.

In an implementation, a quantity of second limit slots 32 is not limited, and is specifically set based on an actual design. In this implementation, there are two second limit slots 32, and the two second limit slots 32 are spaced and arranged on a same side of the fixed support 3.

The third guide post 24 includes a third guide section 241 and two third fixed sections 242 that protrude from two opposite ends of the third guide section 241. The two third fixed sections 242 are fixedly clamped in the two second limit slots 32 respectively.

The fourth guide post 25 includes a second fixed section 251 and two second guide sections 252 that protrude from two opposite ends of the second fixed section 251. The second fixed section 251 is connected to the second boss 33.

The moving support 21 is supported by the third guide section 241 and the two second guide sections 252, and is slidably connected to the third guide section 241 and the second guide section 252, such that the moving support 21 is slidably connected relative to the fixed support 3 along the second direction.

In an implementation, the moving support 21 includes a moving support body 211, and a third support portion 212 and a fourth support portion 213 that are respectively fixed on two opposite sides of the moving support body 211. The third support portion 212 is provided with a third support hole (not shown in the figure) penetrating the third support portion 212 along the second direction. Two opposite ends of the third support hole are respectively provided with two third sliding sleeves 2120. The third support portion 212 is located between two second limit slots 32, and is slidably connected to the third guide section 241 through the two third sliding sleeves 2120. The fourth support portion 213 is hollow and provided with two fourth support holes (not shown in the figure) penetrating the fourth support portion 213 along the second direction. The second boss 33 is accommodated in the fourth support portion 213. Each fourth support hole is provided with a fourth sliding sleeve 2130. Each fourth support portion 213 is slidably connected to the second guide section 252 through two fourth sliding sleeves 2130 corresponding thereto.

In the above-described structure, the second adjusting support 2 adjusts, by using the moving support 21, relative positions of the fourth guide post 25 and the second boss 33 that are not fastened. More specifically, the moving support 21 is supported by the third guide section 241 and two fourth guide sections 252. The second adjusting support 2 adjusts relative positions of a fourth fixed section 251 and the second boss 33, to adjust a parallelism between the third guide post 24 and the fourth guide post 25. A corresponding adjustment principle is essentially the same as that of adjusting, by the first adjusting support 1 by using the lens support 11, the relative positions of the first fixed section 151 and the first boss 23 that are not fastened, to adjust the parallelism between the first guide post 12 and the second guide post 13. Details are not described herein again. Such a structure configuration effectively improves smoothness of position adjustment along the second direction and ensures reliability and accuracy of position adjustment along the second direction.

In an implementation, an end that is of the third fixed section 242 and connected to a bottom surface 321 of the first limit slot 32 is a plane, an end that is of each second fixed section 251 and connected to a top surface 331 of the second boss 33 is a plane, and the bottom surface 321 of the second limit slot 32 and the top surface 331 of the second boss 33 are located in a same plane, such that the third guide post 24 and the fourth guide post 25 are installed coplanarly. Therefore, the third guide post 24 and the fourth guide post 25 are disposed on a same plane, to further ensure adjustment accuracy of the parallelism and effectively improve the parallelism between the third guide post 24 and the fourth guide post 25.

In an implementation, the second adjusting support 2 further includes a third screw 26 and a fourth screw 27. Each third fixed section 242 is provided with a third through hole (not shown in the figure) penetrating the third fixed section 242. Each second limit slot 32 is provided with a third threaded hole (not shown in the figure). The third screw 26 is connected to the third threaded hole through the third through hole to fix the third fixed section 242 into the second limit slot 32. A diameter of the third through hole is greater than a diameter of the third screw 26. Each second fixed section 251 is provided with a fourth through hole (not shown in the figure) penetrating the second fixed section 251. Each second boss 33 is provided with a fourth threaded hole (not shown in the figure). The fourth screw 27 is connected to the fourth threaded hole through the fourth through hole to press the second fixed section 251 against the second boss 33. A diameter of the fourth through hole is greater than a diameter of the fourth screw 27. In other words, there is a certain gap between the third screw 26 and the third through hole, and there is also a certain gap between the fourth screw 27 and the fourth through hole. This configuration is equivalent to reserving certain space for the third guide post 24 and the fourth guide post 25 to move during installation, effectively improving the adjustment accuracy of the parallelism between the third guide post 24 and the fourth guide post 25. In actual application, based on a demand for actual accuracy, the gap may be set specifically to realize a gap at a micron level, so as to further improve accuracy of the parallelism between the third guide post 24 and the fourth guide post 25.

As shown in FIG. 2, FIG. 4, and FIG. 6, in actual application, to realize automatic position adjustment, the lens adjusting device 100 may further be provided with a drive mechanism.

In an implementation, the lens adjusting device 100 further includes a first drive mechanism 4 and a second drive mechanism 5.

As shown in figures, the first drive mechanism 4 is fixed to the moving support 21 and connected to the lens support 31, to drive the lens support 31 to be slidably connected relative to the moving support 21 along the first direction (namely, the x-axis direction).

The second drive mechanism 5 is fixed to the fixed support body 11 and connected to the moving support 21, to drive the moving support 21 to be slidably connected relative to the fixed support 3 along the second direction (namely, the y-axis direction).

It should be noted that structural forms of the first drive mechanism 4 and the second drive mechanism 5 are not limited herein. They may be either sliding cylinders or drive motors, which may be selected based on an actual design need. For example, in this implementation, both the first drive mechanism 4 and the second drive mechanism 5 are drive motors with threads formed on an output shaft. Correspondingly, the first adjusting support 1 includes a second threaded connecting element 16 fixed to the lens support 31 and threadedly connected to the output shaft of the second drive mechanism 5, and the second adjusting support 2 includes a first threaded connecting element 28 fixed to the moving support 21 and threadedly connected to the output shaft of the first drive mechanism 4.

As shown in FIG. 2 and FIG. 7 to FIG. 9, the present disclosure further provides a projection apparatus 200, including a lens 1a, an optical machine assembly 2a, and the lens adjusting device 100 described in the present disclosure. A side, away from the second adjusting support 2, of the fixed support 3 is connected to the optical machine assembly 2a, and the lens 1a is fixed to the lens support 11.

In the above-described structure, position adjustment in the first direction and position adjustment in the second direction are two degrees of freedom related to position adjustment of a projection image. The lens adjusting device 100 ensures reliability of position adjustment of the installed lens 1a along the first direction and/or the second direction, to achieve high projective quality of the projection apparatus 200.

It should be noted that, during position adjustment of the projection image, the projection apparatus 200 jitters, and when the projection apparatus 200 is installed upright and hoisted, there is a large deviation between optical-axis pitching and a focal length of the lens 1a.

In order to resolve this problem, in an implementation, the optical machine assembly 2a includes an optical machine and an optical-machine bottom case 20a for installing the optical machine. The projection apparatus 200 further includes a plurality of adjustable connecting assemblies 3a for connecting the optical-machine bottom case 20a and the fixed support 3, the optical-machine bottom case 20a is provided with an adjusting stud 201a protruding from a position corresponding to each adjustable connecting assembly 3a, and the fixed support 3 is provided with a threaded connecting hole 301 and a fifth through hole 302 that correspond to the adjustable connecting assembly 3a.

It should be noted that a quantity of adjustable connection assemblies 3a is not limited, and may be set specifically based on an actual design need. For example, in this implementation, an example in which the fixed support 3 is rectangular is used for description. There are four adjustable connection assemblies 3a disposed at four corners of the fixed support 3 respectively.

Each adjustable connecting assembly 3a includes a fastening nut 31a, a fastening screw 32a, an adjusting nut 33a, and an adjusting spring 34a. The fastening screw 31a is connected to the fixed support 3 through the threaded connecting hole 301 and pressed against the optical-machine bottom case 20a. The fastening nut 32a is threadedly connected to a side, away from the optical-machine bottom case 20a, of the fastening screw 31a and abuts against the fixed support 3. The adjusting stud 201a penetrates the fifth through hole 302 and is threadedly connected to the adjusting nut 33a. The adjusting spring 34a is inserted into the adjusting stud 201a. Two opposite ends of the adjusting spring 34a are respectively pressed against the optical-machine bottom case 20a and the fixed support 3.

In the above-described structure, an adjusting mechanism is constituted by the adjusting stud 201a, the adjusting nut 33a, and the adjusting spring 34a, and a certain distance is reserved between the optical-machine bottom case 20a and the fixed support 3 for three-dimensional adjustment of pitching and axial movement of the lens adjusting support 100. The adjusting nut 33a is adjusted comprehensively to fine adjust a pitching angle of a whole base of the lens support of the lens adjusting device 100 and achieve fine adjustment along an optical-axis direction (namely, a z-axis direction) of the lens 1a, so as to drive the lens 1a to realize three-dimensional fine adjustment. In addition, defocusing is effectively avoided and projective quality is improved. A fastening structure is constituted by the fastening nut 31a and the fastening screw 32a to avoid asynchronous movement, sudden change, or discontinuity when adjusting the pitching angle (namely, the z-axis direction). This effectively prevents the projection apparatus 200 from jittering along the optical-axis direction, ensures a small deviation between the optical-axis pitching and the focal length of the lens 1a, improves the projective quality, and improves stability of a connection between the optical-machine bottom case 20a and the fixed support 3.

In an implementation, a first accommodating groove 310 connected to the fifth through hole 302 is formed by being recessed from the fixed support 3 at a position corresponding to the adjusting spring 34a, a second accommodating groove 202a forming accommodating space 10 together with the first accommodating groove 110 is formed by being recessed from the optical-machine bottom case 20a, and the adjusting stud 201a and the adjusting spring 34a are accommodated in the accommodating space 10. Such a structure configuration effectively releases a distance setting between the optical-machine bottom case 20a and the fixed support 3, makes an overall size of the projection apparatus 200 smaller, and improves space utilization. In addition, it improves installation stability of the adjusting spring 34a, avoids an adverse effect of external force on the adjusting spring 34a in an adjustment process, and effectively ensures reliability of adjustment along a third direction.

Compared with related technologies, in the lens adjusting device provided in the present disclosure, the first guide post is fixedly clamped in the first limit slot, and the second guide post is connected to the first boss. Based on this structural configuration, in the assembling process, the first guide post is completely and fixedly clamped in the first limit slot, and the second guide post is connected to the first boss to ensure that they are not fastened, such that the relative positions of the second guide post and the first boss that are not fastened are adjusted by using the lens support, so as to adjust the parallelism between the second guide post and the first guide post, effectively improve the parallelism between the second guide post and the first guide post, and ensure that the first guide post and the second guide post are parallel. This avoids asynchronous movement, sudden change, discontinuity, or jamming when the lens support slides relatively on the first guide post and the second guide post in the adjustment process, thereby effectively improving adjustment smoothness and ensuring reliability of position adjustment. The projection apparatus in the present disclosure adopts the lens adjusting device in the present disclosure, which achieves high position adjustment reliability of the projection apparatus and effectively improves the projective quality of the projection apparatus.

The above described are merely implementations of the present disclosure. It should be noted herein that those of ordinary skill in the art may make improvements without departing from the concept of the present disclosure, but such improvements shall fall within the protection scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. A lens adjusting device, comprising:
 a first adjusting support, wherein the first adjusting support comprises a lens support, a first guide post and a second guide post, the first and second guide posts being separated from each other, respectively disposed on two opposite sides of the lens support and each extending along a first direction; and
 a second adjusting support, wherein the second adjusting support comprises a moving support, a first limit slot recessed from a side of the moving support, and a first boss protruding from another side of the moving support,
 wherein the first guide post is fixedly clamped in the first limit slot, the second guide post being connected to the first boss, and the lens support being supported by the first guide post and the second guide post and slidably connected to the first guide post and the second guide post, such that the lens support is slidable relative to the second adjusting support along the first direction;

wherein the lens support is configured to adjust a position of the second guide post relative to the first boss prior to the second guide post and the first boss being fastened to each other to parallel the second guide post and the first guide post.

2. The lens adjusting device according to claim 1, wherein the second adjusting support comprises two first limit slots spaced apart and arranged on a same side of the moving support, wherein the first guide post comprises a first guide section and two first fixed sections that protrude from two opposite ends of the first guide section, the two first fixed sections respectively fixedly clamped in the two first limit slots, wherein the second guide post comprises a second fixed section and two second guide sections that protrude from two opposite ends of the second fixed section, the second fixed section connected to the first boss, wherein the lens support is supported by the first guide section and the two second guide sections, wherein position of the second fixed section relative to the first boss are adjusted to parallel the second guide post and the first guide post.

3. The lens adjusting device according to claim 2, wherein an end of each first fixed section connected to a bottom surface of a respective first limit slot is a plane, wherein an end of each second fixed section connected to a top surface of the first boss is a plane, and wherein the bottom surface of each first limit slot is located in a same plane as the top surface of the first boss.

4. The lens adjusting device according to claim 2, wherein the first adjusting support further comprises a first screw and a second screw; each of the two first fixed sections is provided with a first through hole, each first limit slot being provided with a first threaded hole, and the first screw being connected to the first threaded hole through the first through hole to fix the first fixed section in the first limit slot, wherein each second fixed section is provided with a second through hole, each first boss being provided with a second threaded hole, and the second screw being connected to the second threaded hole through the second through hole to press the second fixed section against the first boss.

5. The lens adjusting device according to claim 2, wherein the lens support comprises a lens support body, a first support portion and a second support portion, the first support portion and the second support portion being hollow and respectively fixed on two opposite sides of the lens support body, wherein the first support portion comprises two first support holes penetrating therethrough along the first direction, each first support hole being provided with a first sliding sleeve, wherein the first support portion is located between the two first limit slots, and is slidably connected to the first guide section through two first sliding sleeves; wherein the second support portion comprises two second support holes penetrating therethrough along the first direction, each second support hole being provided with a second sliding sleeve, wherein the second support portion is slidably connected to the second guide section through two second sliding sleeves corresponding thereto; wherein the first boss is accommodated in the second support portion.

6. The lens adjusting device according to claim 1, further comprising a first drive mechanism fixed onto the moving support and connected to the lens support, wherein the first drive mechanism drives the lens support to slide relative to the lens support along the first direction.

7. The lens adjusting device according to claim 1, further comprising a fixed support;
wherein the fixed support comprises a fixed support body, at least one second limit slot recessed from a side of the fixed support body, and a second boss protruding from another side of the fixed support body;
the second adjusting support further comprises a third guide post and a fourth guide post that are respectively disposed on two opposite sides of the moving support and each extend along a second direction, the third guide post being fixedly clamped in the at least one second limit slot, the fourth guide post being connected to the second boss, and the moving support being supported by the third guide post and the fourth guide post, and slidably connected to the third guide post and the fourth guide post, such that the moving support is slidable relative to the fixed support along the second direction, wherein the first direction is perpendicular to the second direction;
wherein the moving support is configured to adjust a position of the fourth guide post relative to the second boss prior to the fourth guide post and the second boss being fastened to each other to parallel the fourth guide post and the third guide post.

8. The lens adjusting device according to claim 7, wherein the at least one second limit slot comprises two second limit slots, the two second limit slots being spaced and arranged on a same side of the fixed support, wherein the third guide post comprises a third guide section and two third fixed sections that protrude from two opposite ends of the third guide section, the two third fixed sections being fixedly clamped in the two second limit slots, respectively, wherein the fourth guide post comprises a fourth fixed section and two fourth guide sections that protrude from two opposite ends of the fourth fixed section, the fourth fixed section being connected to the second boss, wherein the moving support is supported by the third guide section and the two fourth guide sections, and wherein a position of the fourth fixed section relative to the second boss is adjusted to parallel the fourth guide post and the third guide post.

9. The lens adjusting device according to claim 8, wherein an end of each third fixed section connected to a bottom surface of a respective second limit slot is a plane, wherein an end of each fourth fixed section and connected to a top surface of the second boss is a plane, and wherein the bottom surface of each of the two second limit slots is located in a same plane as the top surface of the second boss.

10. The lens adjusting device according to claim 8, wherein the second adjusting support further comprises a third screw and a fourth screw, wherein each third fixed section is provided with a third through hole, each second limit slot being provided with a third threaded hole, the third screw being connected to the third threaded hole through the third through hole to fix the third fixed section in the second limit slot, wherein each fourth fixed section is provided with a fourth through hole, each second boss being provided with a fourth threaded hole, the fourth screw being connected to the through threaded hole through the fourth through hole to press the fourth fixed section against the second boss.

11. The lens adjusting device according to claim 8, wherein the moving support comprises a moving support body, and a third support portion and a fourth support portion that are fixed on two opposite sides of the moving support body, respectively, wherein the third support portion is provided with a third support hole penetrating therethrough along the second direction, two opposite ends of the third support hole being respectively provided with two third sliding sleeves, the third support portion being located between the two second limit slots, and slidably connected to the third guide section through the two third sliding sleeves, wherein the fourth support portion is hollow and provided with two fourth support holes penetrating therethrough along the second direction, the second boss being accommodated in the fourth support portion, wherein each of the two fourth support holes is provided with a fourth sliding sleeve, each fourth support portion being slidably connected to the fourth guide section through the fourth sliding sleeve corresponding thereto.

12. The lens adjusting device according to claim 7, further comprising a second drive mechanism fixed onto the fixed support body and connected to the moving support, wherein the second drive mechanism drives the moving support to slide relative to the fixed support along the second direction.

13. A projection apparatus, comprising a lens and an optical machine assembly, wherein the projection apparatus comprises the lens adjusting device according to claim 1.

14. The projection apparatus according to claim 13, wherein the lens adjusting device further comprises a fixed support; wherein a side, away from the second adjusting support, of the fixed support is connected to the optical machine assembly, the lens being fixed to the lens support.

15. The projection apparatus according to claim 14, wherein the optical machine assembly comprises an optical machine and an optical-machine bottom case for installing the optical machine, wherein the projection apparatus further comprises a plurality of adjustable connecting assemblies for connecting the optical-machine bottom case and the fixed support, wherein the optical-machine bottom case is provided with an adjusting stud protruding from a position corresponding to each of the plurality of adjustable connecting assemblies, the fixed support being provided with a fifth through hole and a threaded connecting hole corresponding to each of the plurality of adjustable connecting assemblies, wherein each of the plurality of adjustable connecting assemblies comprises a fastening nut, a fastening screw, an adjusting nut, and an adjusting spring, wherein the fastening screw is connected to the fixed support through the threaded connecting hole and pressed against the optical-machine bottom case, wherein the fastening nut is threadedly connected to a side, away from the optical-machine bottom case, of the fastening screw and abuts against the fixed support, wherein the adjusting stud penetrates the fifth through hole and is threadedly connected to the adjusting nut, wherein the adjusting spring is inserted into the adjusting stud, two opposite ends of the adjusting string being respectively pressed against the optical-machine bottom case and the fixed support.

16. The projection apparatus according to claim 15, wherein a first accommodating groove connected to the fifth through hole is formed by being recessed from the fixed support at a position corresponding to the adjusting spring, wherein a second accommodating groove forming accommodating space together with the first accommodating groove is formed by being recessed from the optical-machine bottom case, and wherein both the adjusting stud and the adjusting spring are accommodated in the accommodating space.

17. The projection apparatus according to claim 13, wherein the second adjusting support comprises two first limit slots spaced apart and arranged on a same side of the moving support, wherein the first guide post comprises a first guide section and two first fixed sections that protrude from two opposite ends of the first guide section, the two first fixed sections respectively fixedly clamped in the two first limit slots, wherein the second guide post comprises a second fixed section and two second guide sections that protrude from two opposite ends of the second fixed section, the second fixed section connected to the first boss, wherein the lens support is supported by the first guide section and the two second guide sections, wherein position of the second fixed section relative to the first boss are adjusted to parallel the second guide post and the first guide post.

18. The projection apparatus according to claim 13, wherein the lens adjusting device further comprises a first drive mechanism fixed onto the moving support and connected to the lens support, wherein the first drive mechanism drives the lens support to slide relative to the lens support along the first direction.

19. The projection apparatus according to claim 13, wherein the lens adjusting device further comprises a fixed support; wherein the fixed support comprises a fixed support body, at least one second limit slot recessed from a side of the fixed support body, and a second boss protruding from another side of the fixed support body;

the second adjusting support further comprises a third guide post and a fourth guide post that are respectively disposed on two opposite sides of the moving support and each extend along a second direction, the third guide post being fixedly clamped in the at least one second limit slot, the fourth guide post being connected to the second boss, and the moving support being supported by the third guide post and the fourth guide post, and slidably connected to the third guide post and the fourth guide post, such that the moving support is slidable relative to the fixed support along the second direction, wherein the first direction is perpendicular to the second direction;

wherein the moving support is configured to adjust a position of the fourth guide post relative to the second boss prior to the fourth guide post and the second boss being fastened to each other to parallel the fourth guide post and the third guide post.

20. The projection apparatus according to claim 19, wherein the lens adjusting device further comprises a second drive mechanism fixed onto the fixed support body and connected to the moving support, wherein the second drive mechanism drives the moving support to slide relative to the fixed support along the second direction.

* * * * *